(No Model.) 4 Sheets—Sheet 1.
F. W. HOWE.
UNIVERSAL EXERCISING MACHINE.
No. 435,180. Patented Aug. 26, 1890.
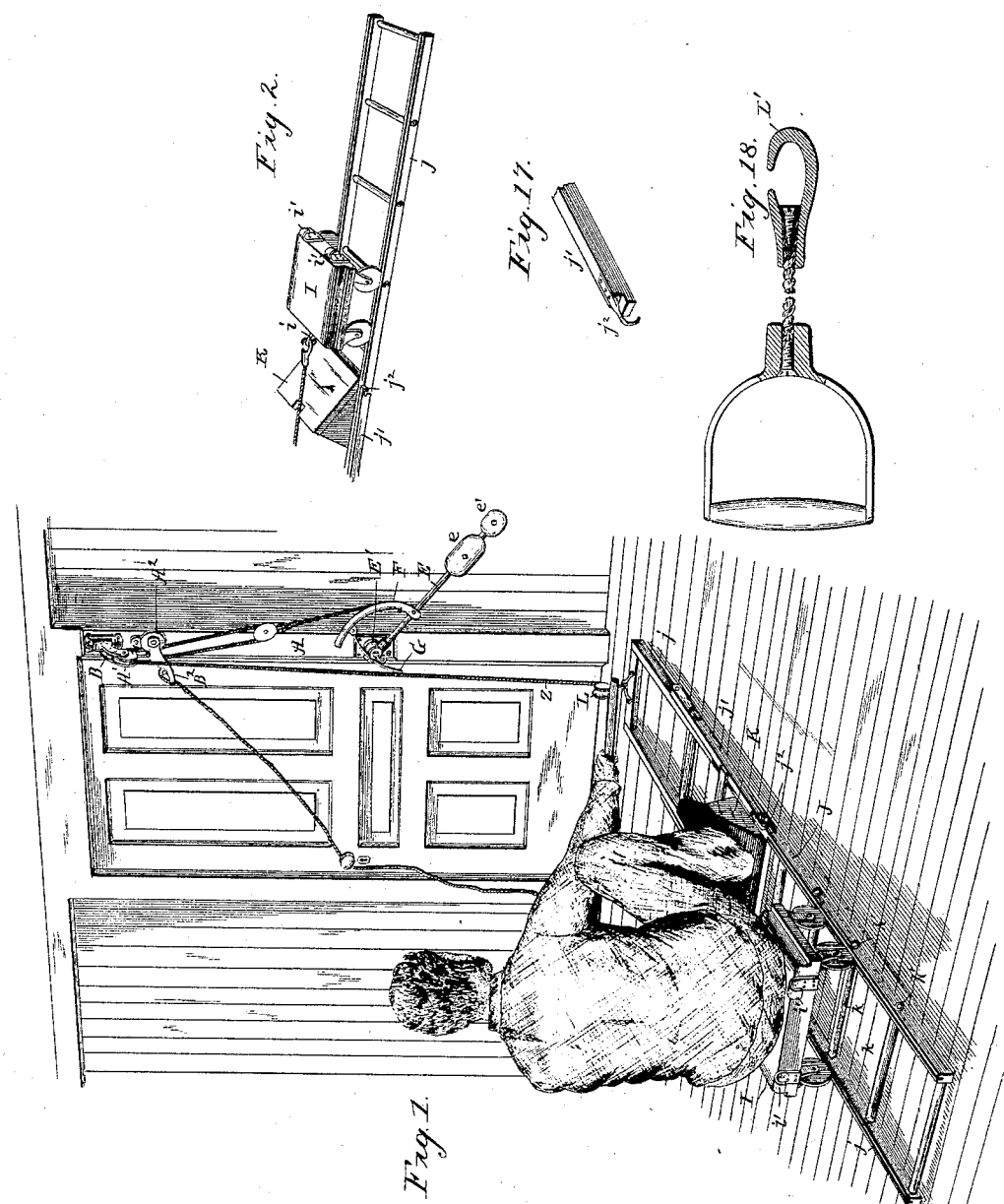
Witnesses.
Edwin L. Bradford
Geo. M. Copehaver
Inventor
Frank W. Howe
By his Attorneys
V. D. Stockbridge (No Model.) 4 Sheets—Sheet 2.
F. W. HOWE.
UNIVERSAL EXERCISING MACHINE.
No. 435,180. Patented Aug. 26, 1890.
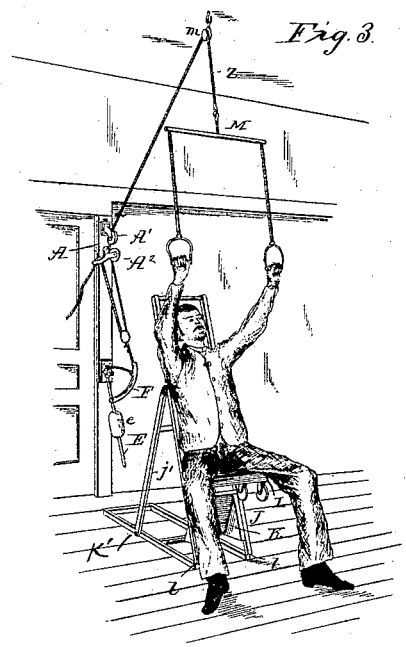
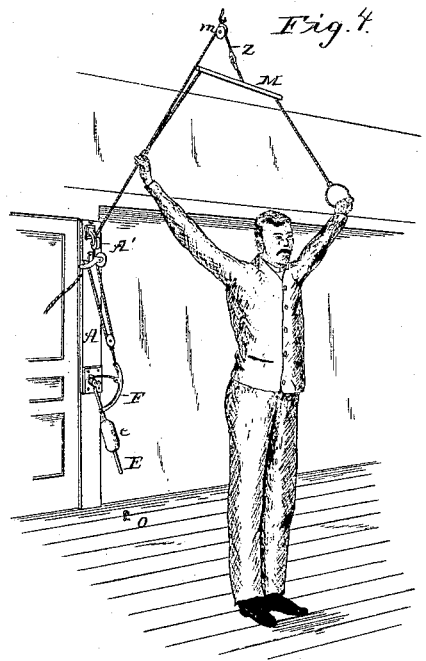
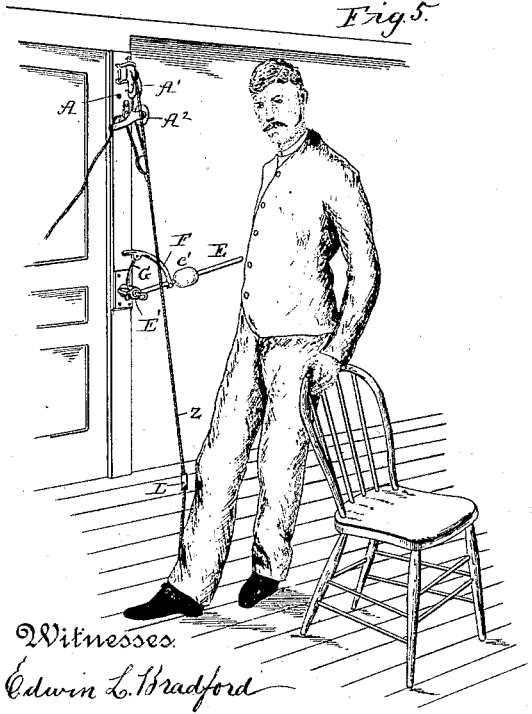
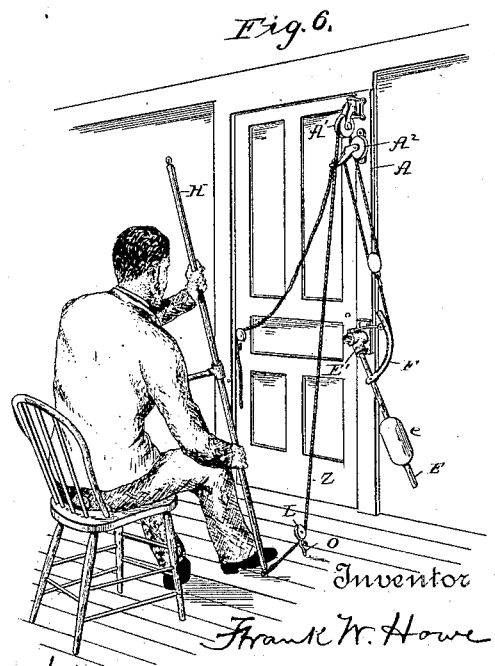

(No Model.) 4 Sheets—Sheet 3.
F. W. HOWE.
UNIVERSAL EXERCISING MACHINE.
No. 435,180. Patented Aug. 26, 1890.
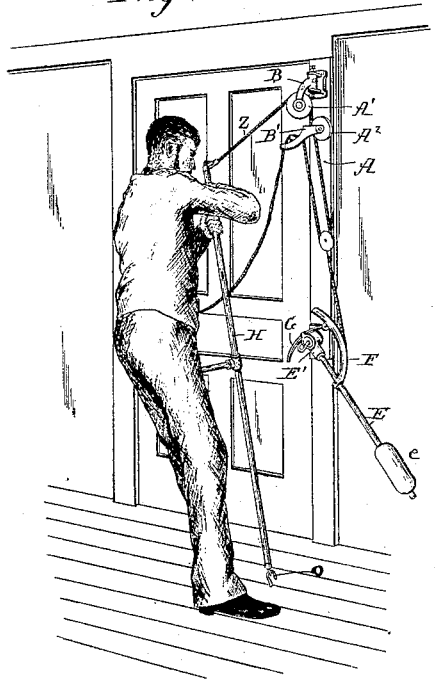
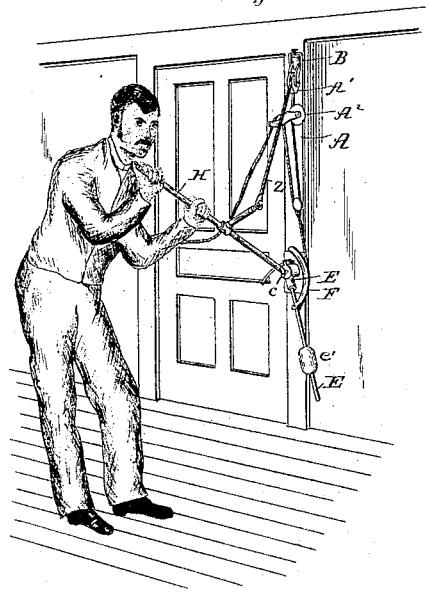
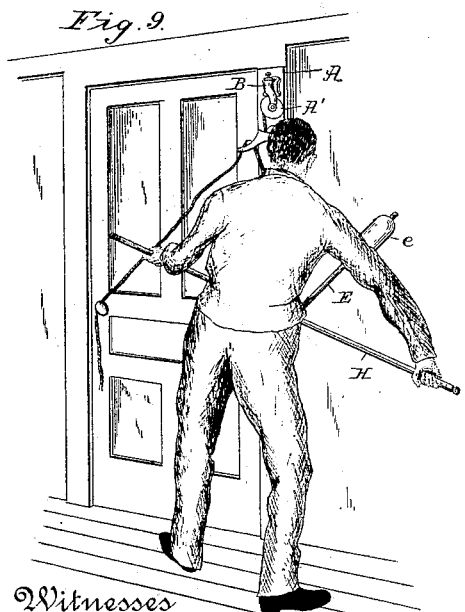
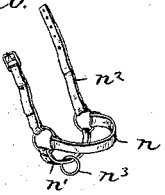
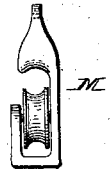
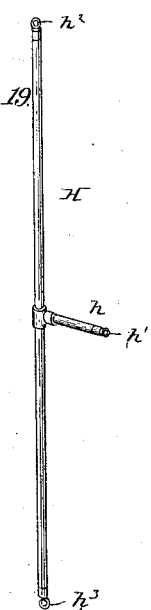
Witnesses
Edwin L Bradford
Geo. M. Copenhaver
Inventor
Frank W. Howe
By his Attorneys
V. D. Stockbridge & Son (No Model.)
F. W. HOWE.
UNIVERSAL EXERCISING MACHINE.
No. 435,180. Patented Aug. 26, 1890.
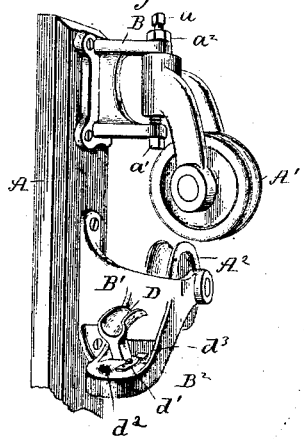
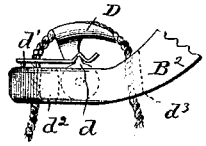
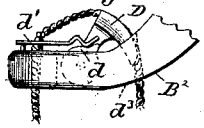
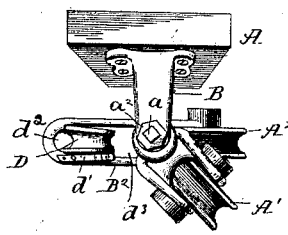
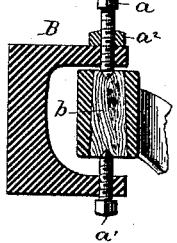
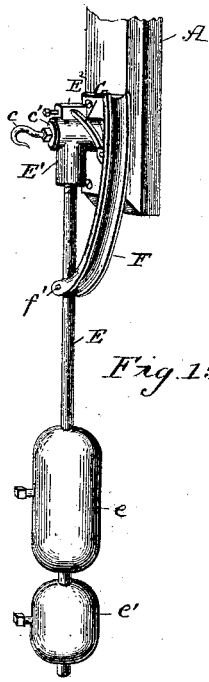
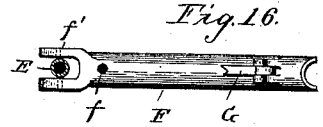
Witnesses
Edwin L. Bradford
Geo. M. Copenhaver
Inventor
Frank W. Howe
By his Attorneys
V. D. Stockbridge & Son

UNITED STATES PATENT OFFICE.

FRANK W. HOWE, OF PETOSKEY, MICHIGAN.

UNIVERSAL EXERCISING-MACHINE.

SPECIFICATION forming part of Letters Patent No. 435,180, dated August 26, 1890.

Application filed September 17, 1889. Serial No. 324,266. (No model.)

*To all whom it may concern:*

Be it known that I, FRANK W. HOWE, a citizen of the United States, residing at Petoskey, Emmet county, Michigan, have invented certain new and useful Improvements in Universal Exercising-Machines; and I do hereby declare the following to be a full, clear, and exact description of the invention, such as will enable others skilled in the art to which it appertains to make and use the same.

My invention relates to improvements in exercising-machines, either portable or otherwise.

The object of the invention is to provide a weight or resistance which may be regulated with great precision to accommodate the different requirements of the various muscles and different character of exercise. In some cases it is desirable to have the first part of the pull or movement very easy and gradually increasing to a maximum of resistance, and afterward relaxing somewhat as the reach is extended. It is also sometimes desirable to have the pull hardest at the beginning.

Another object of the invention is convenience in adjustment to vary the exercise from one kind to another.

To these and other ends the invention consists, primarily, in a pendulum weight or resistance which at first offers only slight resistance, but gradually increases to a maximum, and is adapted to afterward ease off or relax the strain as the reach is extended.

It further consists in various means for adjusting and regulating in some measure the kind of resistance as well as the amount of the same.

It also consists in improved details of construction and combinations of instrumentalities hereinafter described, and pointed out in the claims, whereby the chief muscles of the body may be exercised and developed—such, for example, as are brought into play by a rowing-machine, under-thigh developer, chest and back exerciser, finger-machine, intercostal and back and loin machine, leg and rotating ankle machine, paddling-machine, waist-developer, horizontal wrist-roll, sculling-machine, vertical wrist-roll, wrestling-machine, and other devices of like character, the whole constituting what I have denominated a "universal exerciser."

In the drawings forming a part of this specification, Figure 1 is a perspective of the apparatus adjusted as a rowing-machine. Fig. 2 is a similar view arranged as an under-thigh developer. Fig. 3 shows its application as a chest bar or weight and back-brace, and also adapted as a finger-machine. Fig. 4 shows its application as an intercostal machine for developing the muscles used in breathing, &c. Fig. 5 shows its application as a leg-exerciser for developing the flexors, extensors, the adductors and abductors, and the twisting muscles of the leg. Fig. 6 shows the application as a paddling-machine. Fig. 7 shows the apparatus as a waist-developer. Fig. 8 shows the application of the apparatus as a horizontal wrist-roll, a wrist-machine, a sculling-machine, and vertical wrist-roll. Fig. 9 shows it as a wrestling-machine. Fig. 10 is a side perspective showing my two wall-pulleys. Fig. 11 is a top perspective of the same, the upper pulley being swung around to the right. Figs. 12 and 13 are side elevations of a device for clamping and holding one end of the operating-rope. Fig. 14 shows in section the upper bracket and the bearings of the swiveled pulley. Fig. 15 is a perspective of the pendulum and weight, with its connections, as attached to a supporting-strip. Fig. 16 is a plan of the pendulum-segment. Fig. 17 is a detail of the hook securing the brace of the convertible track-frame and back-rest. Fig. 18 is a section of the rope-hook. Fig. 19 is an elevation of the compound handle-bar. Fig. 20 shows the foot-strap, and Fig. 21 is an enlarged view of the slotted ceiling-pulley.

A is a strip of lumber adapted to be screwed or otherwise fastened against a wall, and upon which the guide-pulleys and pendulum-weight are mounted.

$A'$ and $A^2$ are small wall-pulleys mounted in suitable blocks and supported on the strip A by brackets B and $B'$. The pulley $A'$ is swiveled and adapted to swing freely in its bearing. The bearings of the pulley-block consist of a tapering hard-wood plug $b$, driven into the socket, and conically-pointed set screws $a$ and $a'$, which enter the ends of the wooden plug, as shown. A lock-nut $a^2$ prevents the set-screws from becoming loose.

The bracket B' is provided with an extension B², carrying the rope-locking device, which consists of a vibrating clamp D, provided with a cam projection or lug $d$, and a friction-spring $d'$, secured to the bracket so as to bear upon the lug. In Fig. 12 this locking device is shown open or unlocked, as it would be when drawing on the outer extremity of the rope, and in Fig. 13 as in the locking or clamped position to hold the rope from yielding when in use. The friction-spring normally tends to hold the clamp D in its open or closed position when the same is at rest.

E is the pendulum-bar, preferably made of three-quarter-inch gas-pipe screwed into the angle-coupling E', which swings on a bolt or stud extending laterally from the strip A. The washer $c'$ of the hook $c$ serves as a cap-screw to hold the coupling-piece in place.

Upon the pendulum-bar are mounted one or more weights $e\ e'$, adjustably secured thereon by means of set-screws. I have shown two weights of different sizes; but, obviously, either may be dispensed with.

F is a segment grooved on the outside to keep the rope in position, and is perforated at $f$ for the convenient attachment of a rope for coupling the pendulum-bar with the tackle-block of the machine. The end of the rope or cord is passed through the hole $f$ and knotted, and is thence passed around the segment to the tackle-block and secured thereto. The segment is pivoted at $f'$ to the pendulum-bar. The segment has pivoted to its inner side another segmental guide-piece G, which passes through a guide-eye in the projecting lug E². By means of this and the set-screw in the lug E² the segment F may be adjusted with relation to the pendulum-bar.

The operating cord or rope is provided at one end with a suitable hook L', a preferred form of which is shown in section, Fig. 18. This cord leads at all times through the swiveled upper wall-pulley A' downward past the guide-pulley A², around the sheave in the pulley-block, thence back through a passage $d^3$ in the bracket-extension B², over the rocking clamp D, and down through a guide-hole $d^2$, where it comes within reach of the operator for adjustment to give out or take in the cord to or from the operating end, as may be required in the different applications of the machine.

When it is desired to adjust the length of the operating-cord, the free end is pulled smartly until the clasp opens, as shown in Fig. 12. The cord is then freely pulled either way to the required extent, and then, while the free end is held taut, a sudden pull on the operating end draws the clamp over into the locking position, as shown in Fig. 13.

In the rowing-machine, as shown in Fig. 1, a small pulley L is connected to a hook in the floor of the apartment, and the operating-cord is led through said pulley and hooked to my double handle $m$. (Shown at Figs. 3 and 4.) A compound handle-bar (shown detached at Fig. 19) is made of hard wood, and is provided with the lateral arm $h$ and with hooks or rings $h'\ h^2\ h^3$ at its extremities for connections with other hooks or eyes, as will hereinafter appear. The hook $h^3$ at the lower end is swiveled. A track-frame J, upon which is mounted a sliding or movable seat I, is used in the rowing exercise. The seat has trucks to roll on and a ring $i$, to which the operating-rope may be hooked, and hooks $i'$, for grasping one of the rungs $k$ of the track-frame for use, as shown in Fig. 3.

The foot-rest K is suitably shaped to support the feet.

The rails of the track-frame are jointed, so that they may be folded up when not in use, and also so that they may be adjusted to form a seat-support and back-rest, as shown in Fig. 3, the brace-frame $j'$ being pivoted to said rails for the purpose of completing such support. The brace-frame is provided with suitable hooks $j^2$ for engaging the rings $k'$.

When using the rowing-machine both weights are attached to the outer extremity of the pendulum-bar, the cord is let out, and its outer end fastened by the clamp, as hereinbefore described. The operating end of the cord is led through the pulley L and secured to the double handles. The operator now takes position on the sliding seat facing the machine with his feet on the foot-rest, and by grasping the double handle he obtains a close approximation of the exercise of rowing, the grooved segment being thrown inward, so as to make the tension nearly uniform from beginning to end. After rowing the double handles may be placed behind the toes or on the top of the feet, and by tightening the cord to the proper degree the anterior tibial muscles may be exercised by drawing the toes backward. By disconnecting the double handles and hooking the cord to the ring $i$ in front of the seat the operator, by turning his back to the machine and by putting his heels over the rungs of the track-frame, may draw himself outward by the thigh-muscles, as shown in Fig. 2. This constitutes an under-thigh developer. By facing the machine under this arrangement the extensors of the thigh may be exercised.

In Fig. 3 the operating-cord is led through a block depending from the ceiling, thus furnishing the means for a vigorous exercise of the muscles of the chest and abdomen. The track is opened at its hinge at $l$ and may be adjusted at any angle to serve as a back-rest. This is done by means of the brace-frame $j'$, having hooks at its ends which couple with the hooks or rings $k'$. The sliding seat I is attached to one of the rungs $k$ by the hooks $i'$. The back may be set directly upright, if so desired. The rope passes from the wall-pulleys up over a pulley $m$ and down again, connecting with the double handle or cross-bar M, having single handles attached thereto. The machine is now a chest and back exerciser. One may also stand facing this back and pull the handles down from the overhead pulley until the thumbs can be passed under the top round. In this position the fingers may be exercised to any degree. This back brace may be still further inclined toward the floor-pulley and the cord attached to the middle ring of the double handle. In this form the cord is drawn directly outward and downward from the swivel-pulley.

Fig. 4 shows the arrangement for developing the chest-muscles. The ceiling-pulley block is open at the side, whereby the cord is readily adjusted over the sheave by using the long compound handle shown in Fig. 19. This is known as an "intercostal attachment."

Fig. 5 shows the use of my device as a leg and rotating ankle machine. In this device I use the foot-strap shown in detail in Fig. 20. The strap $n$ passes around the foot above the heel, strap $n'$ passes under the instep, and strap $n^2$ buckles over the instep. The strap $n'$ is provided with a ring $n^3$, which is free to slide thereon, and to which the hook on the end of the operating-cord is attached. When pulls are made sidewise, this ring slips up to the side of the foot, while in pulling backward or forward the cord passes under the toe or heel. This attachment gives opportunity for a complete exercise of the flexors and extensors both of the thigh and leg, the abductors and adductors, and the twisting muscles of the leg.

Fig. 6 shows the application of my invention to the paddling exercise, one of the most useful of all exercises. In this the compound handle H is employed, the swiveled hook in the lower end of which connects with the end of the operating-cord Z. When the muscles of one side are tired by this exercise, the "paddle" can be shifted to the other side without moving the seat.

Fig. 7 shows the application as a waist-developer. The swiveled hook of the compound handle is connected with the floor-hook $o$, and the operating-rope is secured to the upper end of the compound handle. The upper wall-pulley, being swiveled, permits a vigorous exercise of the whole body from side to side.

In Fig. 8 the swivel-hook of the handle is coupled with the hook $c$, projecting from the pendulum-pivot, and the rope is coupled to the hook or ring which projects from the middle of said handle. The light weight is used and the grooved segment F is thrown far inward. This gives a firm resistance from the first in a twisting movement of the wrists and constitutes what is known as a "horizontal wrist-roll." By standing at the outer end of the compound handle and facing the machine the projection $h$ may be grasped by either hand and the wrist exercised in the same way as on a "wrist-machine." By drawing up the cord until the outer end of the handle can just be reached with both hands and by swinging the body from side to side the exercise of sculling is obtained.

In Fig. 9 a wrestling attachment is shown. In this case the hook $h'$ on the end of the short arm $h$ is coupled with the hook $c$ and the cord connected to one of the hooks at the end of the compound handle H. The cord is then drawn up until the handle stands nearly vertical and locked in position. The exercise consists of a downward-twisting movement of the arms and trunk. When one side of the body is tired, the cord may be changed to the other hook.

The long or compound handle H may have other uses than those herein set forth, and, in fact, the whole machine has a much wider range of application than that described. Sufficient, however, has been shown to indicate that it can develop all the chief muscles of the body and comprises all the apparatus found in the best-equipped gymnasiums. A gymnasium fitted with a number of these machines affords a means for class drill on any desired exercise—a thing that cannot be done in a room fitted entirely with distinct machines. It is also peculiarly adapted for home use, and its capacity for easy and rapid adjustment makes it equally desirable for children, ladies, and gentlemen. It is a complete gymnasium in itself. A pleasing feature of such exercise is that one never tires of it nor is wearied. As soon as one muscle is fatigued the exercise is changed to a fresh one, and when the whole body has been exerted there remains but a pleasant sense of exhilaration.

Having now described my invention, what I claim is—

1. A resistance-weight for exercising-machines, consisting of the combination of a suitable support, a pendulum, and a segment attached to said pendulum, substantially as described.

2. A resistance-weight for exercising-machines, involving the combination of a pendulum and an adjustable segment connected therewith, substantially as described.

3. A resistance-weight for exercising-machines, involving the combination of a pendulum, a segment pivotally connected with the pendulum, and a supplemental segmental part G, whereby the segment may be adjusted with relation to the pendulum, substantially as and for the purpose described.

4. In an exercising-machine, the combination of a swinging or pendulum resistance-weight, an operating-cord connected therewith, guide-pulleys, and a rope-clamp, for the purpose described.

5. In an exercising-machine, the combination of a resistance-weight, an operating-cord, guide-pulleys, a rope-clamp, and a compound handle-bar having swiveled hook or ring, whereby the machine is adapted to manifold exercises, substantially as described.

6. In an exercising-machine, the combination of a folded or jointed track-frame, a brace-frame jointed thereto, and a movable seat having means of attachment with the rungs of the track-frame, as hooks I, whereby the rowing attachment may be converted into a seat and back-brace for chest-exerciser, as described.

7. In an exercising-machine, the combination of a resistance-weight, an operating-cord, a swiveled guide-pulley to permit free movement of the cord in all directions, a rope-clamp, and a ceiling-pulley block having a lateral slot or opening leading to the sheave, substantially as described.

8. In an exercising-machine, the combination of a resistance-weight, an operating-cord, and a rope lock or clamp consisting of a vibrating part D, grooved, as shown, and a friction-spring for normally holding said clamp in the locking or open position, substantially as described.

9. In an exercising-machine, the combination of a pendulum-weight varying its resistance from the beginning, as described, a segment pivotally connected with said pendulum, an operating-cord, guide-pulleys, and a device for connection with the operator, substantially as described.

10. In an exercising-machine, the combination of a pendulum-weight varying its resistance from the beginning, as described, a segment pivotally connected with said pendulum, an operating-cord leading over the ceiling-pulley, a cross-bar having handles constituting an intercostal machine and back and loin developer, substantially as set forth.

In testimony whereof I affix my signature in presence of two witnesses.

FRANK W. HOWE.

Witnesses:
C. L. SMITH,
J. B. GAGE.